US010591988B2

(12) United States Patent
Liao et al.

(10) Patent No.: US 10,591,988 B2
(45) Date of Patent: Mar. 17, 2020

(54) METHOD FOR DISPLAYING USER INTERFACE OF HEAD-MOUNTED DISPLAY DEVICE

(71) Applicant: HiScene Information Technology Co., Ltd, Shanghai (CN)

(72) Inventors: Chunyuan Liao, Shanghai (CN); Rongxing Tang, Shanghai (CN)

(73) Assignee: HISCENE INFORMATION TECHNOLOGY CO., LTD, Shanghai (CN)

( * ) Notice: Subject to any disclaimer, the term of this patent is extended or adjusted under 35 U.S.C. 154(b) by 137 days.

(21) Appl. No.: 15/436,873

(22) Filed: Feb. 20, 2017

(65) Prior Publication Data
US 2017/0371523 A1    Dec. 28, 2017

(30) Foreign Application Priority Data

Jun. 28, 2016  (CN) .......................... 2016 2 0658820
Nov. 7, 2016   (CN) .......................... 2016 1 0976297

(51) Int. Cl.
| G06F 3/01 | (2006.01) |
| G06F 3/0484 | (2013.01) |
| G06F 3/0481 | (2013.01) |
| G06F 3/0482 | (2013.01) |
| G02B 27/01 | (2006.01) |

(52) U.S. Cl.
CPC ........... *G06F 3/012* (2013.01); *G02B 27/017* (2013.01); *G06F 3/011* (2013.01); *G06F 3/017* (2013.01); *G06F 3/0482* (2013.01); *G06F 3/04815* (2013.01); *G06F 3/04817* (2013.01); *G06F 3/04845* (2013.01); *G02B 2027/0138* (2013.01);
(Continued)

(58) Field of Classification Search
CPC ...................... G06F 2203/04803; G06F 3/012
See application file for complete search history.

(56) References Cited

U.S. PATENT DOCUMENTS 6,333,826 B1 * 12/2001 Charles ................. G02B 13/06
                                                   359/725
7,573,487 B1 *  8/2009 Petersen ............. G06F 3/04817
                                                   345/592
(Continued)

OTHER PUBLICATIONS

Microsoft HoloLens Not Just Another VR Headset (Year: 2015).*
(Continued)

*Primary Examiner* — William L Bashore
*Assistant Examiner* — Nathan K Shrewsbury
(74) *Attorney, Agent, or Firm* — Jun He Law Offices P.C.; James J. Zhu (57) ABSTRACT

A method for displaying a user interface (UI) of a head-mounted display device includes: providing a graphic user interface which includes a main interface region and an auxiliary interface region; displaying, on a display screen of the head-mounted display device, at least a portion of the graphic user interface, wherein, from an observation of a user wearing the head-mounted display device, the at least a portion of the graphic user interface is displayed at a first distance from the user; receiving a user interface movement instruction; and in response to the user interface movement instruction, adjusting a display of the graphic user interface on the display screen, wherein, from the observation of the user, the graphic user interface rotates around the user.

21 Claims, 8 Drawing Sheets

(52) U.S. Cl.
CPC ............ *G02B 2027/0178* (2013.01); *G06F 2203/04803* (2013.01)

(56) References Cited

U.S. PATENT DOCUMENTS

| | | | | |
|---|---|---|---|---|
| 8,884,883 | B2* | 11/2014 | Benko | G06F 3/14 |
| | | | | 345/156 |
| 8,887,043 | B1* | 11/2014 | Pollack | G06F 3/0304 |
| | | | | 345/108 |
| 8,930,839 | B2* | 1/2015 | He | G06F 3/04817 |
| | | | | 715/765 |
| 9,405,435 | B2* | 8/2016 | Hendricks | G06F 3/0482 |
| 9,671,922 | B1* | 6/2017 | Robertson | G06F 3/0481 |
| 2008/0010616 | A1* | 1/2008 | Algreatly | G06F 3/0346 |
| | | | | 715/856 |
| 2011/0032089 | A1* | 2/2011 | Pryor | G06F 3/011 |
| | | | | 340/407.1 |
| 2012/0328196 | A1* | 12/2012 | Kasahara | G06T 15/20 |
| | | | | 382/190 |
| 2013/0145322 | A1* | 6/2013 | Hendricks | G06F 3/04817 |
| | | | | 715/834 |
| 2013/0293580 | A1* | 11/2013 | Spivack | G06Q 30/0643 |
| | | | | 345/633 |
| 2014/0002787 | A1* | 1/2014 | Huang | G02C 5/16 |
| | | | | 351/113 |
| 2014/0063060 | A1* | 3/2014 | Maciocci | G06F 3/011 |
| | | | | 345/633 |
| 2014/0118397 | A1* | 5/2014 | Lee | G06T 7/521 |
| | | | | 345/633 |
| 2014/0118829 | A1* | 5/2014 | Ma | G02B 5/1885 |
| | | | | 359/567 |
| 2014/0184584 | A1* | 7/2014 | Reif | G06T 7/593 |
| | | | | 345/419 |
| 2014/0351770 | A1* | 11/2014 | Abercrombie | G06F 3/011 |
| | | | | 715/863 |
| 2014/0363073 | A1* | 12/2014 | Shirakyan | G06T 7/12 |
| | | | | 382/154 |
| 2015/0049955 | A1* | 2/2015 | Stoeffler | G06K 9/6202 |
| | | | | 382/220 |
| 2015/0070262 | A1* | 3/2015 | Peters | G06F 3/013 |
| | | | | 345/156 |
| 2015/0212647 | A1* | 7/2015 | Kim | G02B 27/017 |
| | | | | 345/173 |
| 2015/0293600 | A1* | 10/2015 | Sears | G06F 3/017 |
| | | | | 345/156 |
| 2016/0018645 | A1* | 1/2016 | Haddick | G06T 19/006 |
| | | | | 345/8 |
| 2016/0062121 | A1* | 3/2016 | Border | G02B 27/0172 |
| | | | | 359/630 |
| 2016/0116745 | A1* | 4/2016 | Osterhout | G06F 3/03547 |
| | | | | 359/614 |
| 2016/0117853 | A1* | 4/2016 | Zhong | B64C 39/024 |
| | | | | 345/634 |
| 2016/0170998 | A1* | 6/2016 | Frank | G06F 16/24578 |
| | | | | 707/748 |
| 2016/0188181 | A1* | 6/2016 | Smith | G06F 3/0414 |
| | | | | 715/765 |
| 2016/0196659 | A1* | 7/2016 | Vrcelj | G06K 9/34 |
| | | | | 382/154 |
| 2016/0292922 | A1* | 10/2016 | Kasahara | G06F 3/1454 |
| 2016/0379408 | A1* | 12/2016 | Wright | G06T 19/006 |
| | | | | 345/633 |
| 2017/0053042 | A1* | 2/2017 | Sugden | G02B 27/0179 |
| 2017/0115728 | A1* | 4/2017 | Park | G02B 27/0093 |
| 2017/0123504 | A1* | 5/2017 | Kim | G06F 1/163 |
| 2017/0249745 | A1* | 8/2017 | Fiala | G06K 9/00671 |
| 2017/0315612 | A1* | 11/2017 | Shanware | G06F 3/013 |
| 2017/0351403 | A1* | 12/2017 | Yazdani | G06F 3/0414 |
| 2017/0351665 | A1* | 12/2017 | Kim | G06F 17/289 |
| 2018/0004385 | A1* | 1/2018 | Lin | H04M 1/725 |
| 2018/0046861 | A1* | 2/2018 | Patel | G06T 7/73 |
| 2018/0129112 | A1* | 5/2018 | Osterhout | G02F 1/153 |
| 2018/0260021 | A1* | 9/2018 | Mullen | G06F 3/01 |

OTHER PUBLICATIONS

SnapToReality: Aligning Augmented Reality to the Real World by Benjamin Nuernberger (Year: 2016).*
Mixed Reality with Microsoft HoloLens Philipp Bauknecht (Year: 2016).*

* cited by examiner

Fig. 6 gesture table

| No. | description of gesture | definition of gesture | | | |
|---|---|---|---|---|---|
| | | beginning of gesture | intermediate state | end of gesture | time | path |

| No. | description of gesture | beginning of gesture | intermediate state | end of gesture | time | path |
|---|---|---|---|---|---|---|
| 1 | click gesture 1 | a forefinger tip touches and then separates from a thumb tip | stretch the forefinger and the thumb, fist the rest fingers, put the palm forward | the forefinger tip touches the thumb tip | stretch the forefinger and the thumb, fist the rest fingers, put the palm forward | the whole process is within 0.5 seconds | |
| 2 | click gesture 2 | a forefinger tip moves forward along an axis Z | stretch the forefinger, fist the rest fingers fist, put the palm forward | stretch the forefinger, fist the rest fingers fist, put the palm forward | stretch the forefinger, fist the rest fingers fist, put the palm forward | the whole process is within 0.5 seconds | moving a certain distance in the Z-axis direction |
| 3 | click drag gesture | a forefinger tip touches but not releases from a thumb tip, and then proceeds with a drag action | stretch the forefinger and the thumb, fist the rest fingers, put the palm forward | the forefinger tip touches the thumb tip | stretch the forefinger and the thumb, fist the rest fingers, put the palm forward | | the path can be any path in the intermediate state |
| 4 | grab drag gesture | A palm makes a fist and moves | stretch five fingers, open a palm and put the palm forward | keep the palm of your hand, fist the fingers | stretch five fingers, open a palm and put the palm forward | | the path can be any path in the intermediate state |
| 5 | zoom in/upward-roll gesture | a palm of one hand waves upward | stretch five fingers, open a palm and put the palm forward | keep the gesture, waves the palm upward | | the whole process is within 0.5 seconds | upward on the X-Y plane |
| 6 | zoom out/downward-roll gesture | a palm of one hand waves downward | stretch five fingers, open a palm and put the palm forward | keep the gesture, waves the palm downward | | The whole process is within 0.5 seconds | downward on the X-Y plane |
| 7 | left turn/roll gesture | a palm of one hand waves left | stretch five fingers, open a palm and put the palm forward | keep the gesture, waves the palm left | | The whole process is within 0.5 seconds | leftward on the X-Y plane |
| 8 | right turn/roll gesture | a palm of one hand waves right | stretch five fingers, open a palm and put the palm forward | keep the gesture, waves the palm right | | the whole process is within 0.5 seconds | rightward on the X-Y plane |
| 9 | close gesture | a palm push forward | stretch five fingers, open a palm and put the palm forward | | stretch five fingers, open a palm and put the palm forward | the whole process is within 0.5 seconds | moving a certain distance in the Z-axis |
| 10 | home page call out gesture | a palm pull backward | stretch five fingers, open a palm and put the back of the palm forward | | stretch five fingers, open a palm and put the palm forward | the whole process is within 0.5 seconds | moving a certain distance in the Z-axis direction |

METHOD FOR DISPLAYING USER INTERFACE OF HEAD-MOUNTED DISPLAY DEVICE

CROSS REFERENCE TO RELATED APPLICATIONS

This application claims priority to Chinese Patent Application No. 201620658820.4 filed on Jun. 28, 2016 and Chinese Patent Application No. 201610976297.4 filed on Nov. 7, 2016, the entire content of which are incorporated herein by reference.

BACKGROUND OF THE INVENTION

1. Technical Field

The present disclosure relates to a technical field of a wearable device, in particular, to a method for displaying a user interface of a head-mounted display device.

2. Related Art

With the rapid development of computer and image processing technology, various head-mounted display devices have been developed, and can be applied to different occasions, e.g. military, navigation, electronic games, entertainment, and media. Augmented reality (AR) glasses are a typical kind of head-amounted display device, which can "seamlessly" integrate reality world information with virtual world information, and display the integration to users, thereby achieving a sensual experience that exceeds reality.

However, due to the limited display area, the conventional user interfaces of AR glasses are not friendly, and is inconvenient for a user to operate, thus affecting the user experience.

SUMMARY

An objective of the present application is to provide a method for displaying user interfaces of a head-mounted display device, and therefore improving the effect of human-computer interaction, and improving the effect brought by interface display in form of near-to-eye display.

In one embodiment, a method for displaying a user interface (UI) of a head-mounted display device is provided. The method includes: providing a graphic user interface which includes a main interface region and an auxiliary interface region; displaying at least a portion of the graphic user interface on a display screen of the head-mounted display device, such that from an observation of a user wearing the head-mounted display device, the at least a portion of the graphic user interface is displayed at a first distance from the user; receiving a user interface movement instruction; and adjusting, in response to the user interface movement instruction, the display of the graphic user interface on the display screen, such that from the observation of the user, the graphic user interface rotates around the user.

The foregoing has outlined, rather broadly, features of the present disclosure. Additional features of the present disclosure will be described, hereinafter, which form the subject of the claims of the present disclosure. It should be appreciated by those skilled in the art that the conception and specific embodiments disclosed herein may be readily utilized as a basis for modifying or designing other structures or processes for carrying out the objectives of the present disclosure. It should also be realized by those skilled in the art that such equivalent constructions do not depart from the spirit and scope of the present disclosure as set forth in the appended claims.

BRIEF DESCRIPTION OF THE DRAWINGS

The aforementioned features and other features of the present disclosure will be further described in the following paragraphs by referring to the accompanying drawings and the appended claims. It will be understood that, these accompanying drawings merely illustrate certain embodiments in accordance with the present disclosure and should not be considered as limitation to the scope of the present disclosure. Unless otherwise specified, the accompanying drawings need not be proportional, and similar reference characters generally denote similar elements.

FIG. 7 is table listing a number of operating gestures that can be used.

DETAILED DESCRIPTION OF THE PREFERRED EMBODIMENTS

The following detailed description refers to the accompanying drawings as a part of the present disclosure. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without deviating from the spirit and subject of the disclosure. It should be understood that, the various aspects of the disclosure described and graphically presented herein may be arranged, replaced, combined, divided and designed in many different configurations, and these different configurations are implicitly included in the disclosure.

Figure 1A:
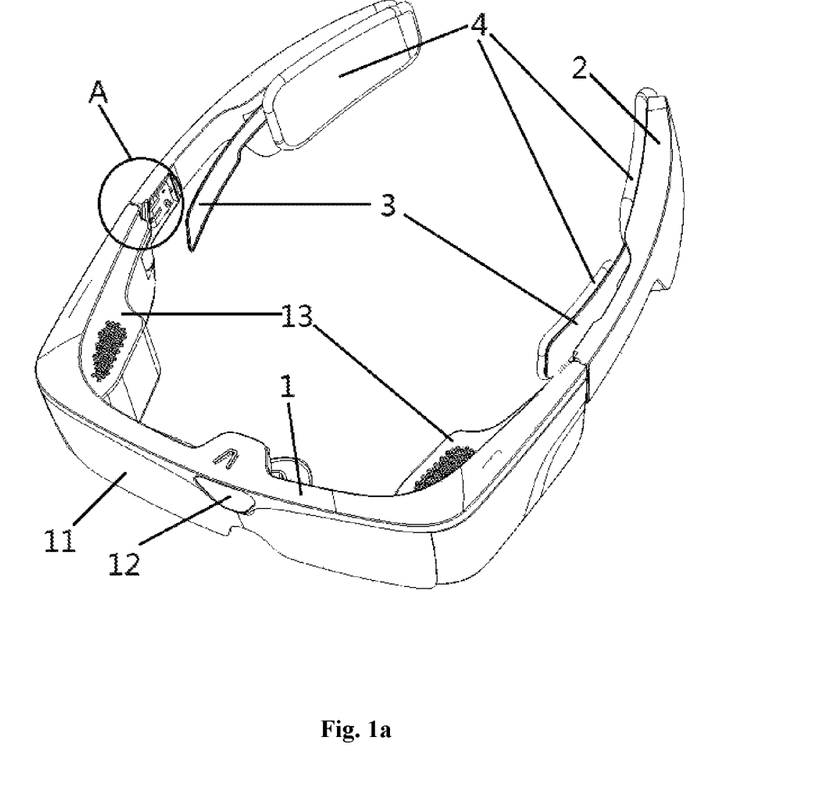
FIG. 1a is a schematic diagram illustrating a head-mounted display device according to an embodiment of the present disclosure.

FIG. 1a illustrates a schematic diagram of a head-mounted display device 10 according to an embodiment of the present disclosure.

As illustrated in FIG. 1a, a wearable smart glasses is provided. The wearable smart glasses may include a glasses frame 1, a pair of glasses legs 2 and a pair of clamping members 3.

In one embodiment, the glasses frame 1 includes a front portion and two lateral portions laterally positioned at two sides of the front portion. The lateral portions extend a distance from the front portion and in a direction perpendicular to a longitudinal direction of the front portion.

According to an embodiment, each of the glasses legs 2 is mounted at one of the lateral portions respectively. Furthermore, each of the glasses legs 2 includes a first end being connected to one of said lateral portions, and a second end being contact with the head of a user at its inner side. In addition, the second end of each of the glasses legs 2 bends inwardly to form a first arc portion.

In another embodiment, each of the glasses legs 2 includes a clamping member. As shown in FIG. 1a, the clamping member is an elastic clamping element 3 disposed at an inner side of the second end of each glasses legs. In addition, each elastic clamping element 3 extends towards the first end of the glasses leg and has a free end bending inwardly to form a second arc portion. With the first and second arc portions in combination, a better fit between the smart glasses and the head of the user can be achieved.

According to an embodiment of the present application, the glasses legs 2 are made of aluminum alloy Al6063. Moreover, the elastic clamping element 3 can be made of stainless steel shrapnel.

According to one embodiment, soft supporting layers 4 can be disposed at respective inner sides of the first and/or second arc portions. Specifically, according to one embodiment of the present application, the soft supporting layers 4 are rubber and/or foam layers. With the soft supporting layers 4, user comfortability can be improved. For example, a pressure onto the user's head may be reduced, and friction between the glasses legs and the user's head may be increased. Thus, it will be more stable and comfortable to wear such smart glasses.

Each of the glasses legs 2 and the glasses frame 1 can be connected by an elastic adapting piece A, as shown in FIG. 1a.

In one embodiment, the smart glasses further includes light-shading lenses 11 mounted to the glasses frame 1. According to another embodiment, the light-shading lenses 11 may have an integrated structure.

According to one embodiment, the smart glasses further includes imaging lenses (not shown) positioned behind the light-shading lenses 11. The imaging lenses can be, for example, semi-transparent and semi-reflective lenses/films, or holographic diffraction waveguide gratings, or other suitable imaging components. For a user who wears the smart glasses, the imaging lenses function as a display screen. From said imaging lenses, display content of the smart wearable glasses, for example, a graphic user interface, can be observed.

Furthermore, in one embodiment, the smart glasses may include a light emitting module 13 disposed at either or both lateral portions of the glasses frame. The light emitting module 13 functions to emit light toward the imaging lenses, thereby forming images on the imaging lenses. It would be appreciated that the present application does not limit the imaging principle of the wearable smart glasses.

In some embodiments, a control circuit can be disposed at one of the lateral portions of the glasses frame. The control circuit is coupled to the light emitting module 13 to control light emitting of the light emitting module 13, i.e. the output of the light emitting module 13.

According to one embodiment, the smart glasses may further include at least a touchpad (now shown) disposed at a lateral portion of the glasses frame 1. The touchpad is configured to generate a touch input signal, and is coupled to the control circuit to provide the control circuit with the touch input signal.

In one embodiment, a depth camera module 12 is disposed at center of the front portion of the glasses frame 1. The depth camera module 12 is configured to collect user's gestures and generate an operation gesture signal accordingly. Furthermore, the depth camera module 12 is coupled to the control circuit to provide the user's gesture signal being collected.

Furthermore, in order to facilitate the understanding of the present application, the principle of the depth camera module 12 is briefly introduced herein. In the field of image processing/computer vision, depth data can be obtained in various manners. For example, depth data can be obtained using a parallax of two cameras, or by capturing a same scenario using a single camera at two different angles, or by calculating the depth data by focusing at different distances.

For example, a dual-camera cab (two cameras) can simulate the operation of human eyes (two eyes can easily locate the distance of an object, but the locating function would be significantly degraded if one eye is closed). Briefly speaking, by calculating two angles between the object and the left or right camera of the dual-camera cab, as well as obtaining a value y (i.e. the distance between the two cameras, which is typically a constant value), a value z (i.e. distance from the object to the user) can be easily calculated.

Another technique of obtaining depth data is Time of Flight (TOF) approach. The TOF approach is a 3d-imaging technique that continuously transmits light pulses to an object, and then receives lights returned from the object using sensors. The distance to the object can be obtained by calculating the time of flight of the light pulses. Depth accuracy of TOF does not vary as the distance varies, and largely performs well at a centimeter level.

Some commercially available depth camera modules can obtain depth values for each pixel of the depth camera modules, such as Kinect. The operating principle of an exemplary module is described as follows, which can be used in the smart glasses of the present application.

Figure 8:
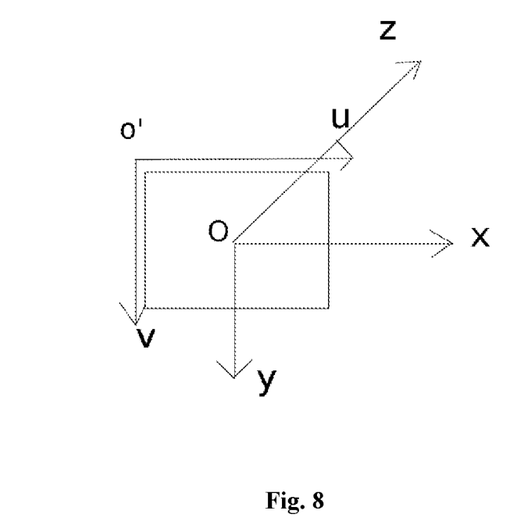
FIG. 8 illustrates a coordinate system of an OpenCV system according to an embodiment of the present disclosure.

Firstly, as shown in FIG. 8, a coordinate system of an OpenCV system is used. The coordinate system o'-uv is an image coordinate system, and the coordinate system o-xyz is a Kinect coordinate system. Assuming that a point in the picture is (u,v) and its corresponding three-dimensional location is (x,y,z), then a conversion relation between them can be obtained by the following equation.

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} x \\ y \\ z \end{bmatrix}$$

The equation above can be simplified as follows.

$$\begin{cases} x = \dfrac{(u - c_x)z}{f_x} \\ y = \dfrac{(v - c_y)z}{f_y} \\ z = dep(u, v)/s \end{cases}$$

The later equations show a method for calculating the position of a three-dimensional point. In particular, depth data (16 bits of unsigned integer is defined in the Kinect system) can be read from depth images, which can be divided by a zoom factor s in direction z, such that an integer of the depth image is transferred to data having a unit of meter. Then, x, y can be calculated using the above equations. In the above equations, symbols $f_x$ and $f_y$ represent a focal distance along axis x or y, respectively, and symbols $c_x$ and $c_y$ represent the position of the center point.

Back to FIG. 1a, the head-mounted display device 10 shown in FIG. 1a can be AR glasses. A user can see contents displayed on the imaging lenses (display), and objects and background in actual environment can be simultaneously seen through the imaging lenses and the shading lenses 11. It's appreciated that, in some embodiments, the head-mounted display device can be virtual reality (VR) glasses, and a user cannot see objects in the actual environment.

For a head-mounted display device, the content being displayed is typically a combination of actual and virtual scenes. Accordingly, compared with a desktop device or a mobile device, the head-mounted display device can have a much larger display area of a GUI, which is observed and operated by a user. In addition, the conventional head-mounted display devices do not have an input device for accurate positioning, thus the user needs to do a lot of operations to input instructions or other information. Accordingly, user experience and interaction effect would be substantially affected if there are too many operating layers or steps in the GUI.

Regarding the above features of the head-mounted display devices, the present disclosure provides a GUI having less interface layers, while being capable of displaying more contents. Furthermore, a user can easily control the head-mounted display device with simple operations, thereby substantially improving the operation efficiency.

Figure 1B:
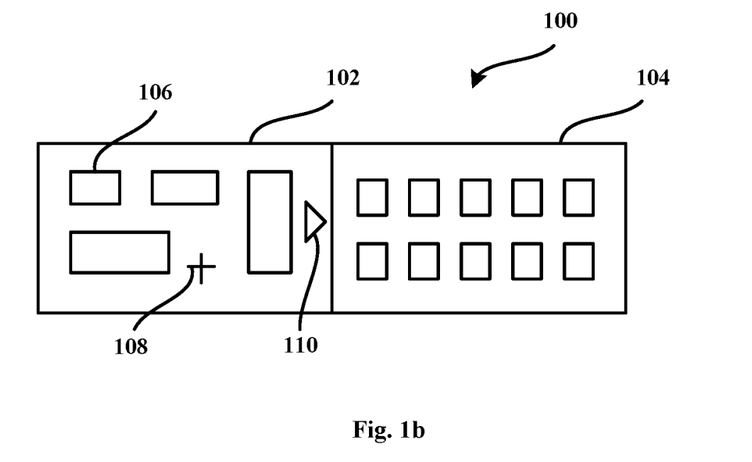
FIG. 1b is a schematic diagram illustrating a graphic user interface (GUI) of a head-mounted display device according to an embodiment of the present disclosure.

FIG. 1b is a schematic diagram illustrating a GUI of a head-mounted display device according to an embodiment of the present disclosure. The head-mounted display device can be augmented reality glasses or virtual reality glasses, both of which can be equipped with a display screen, e.g. imaging lenses described in the example shown in FIG. 1a. When a user wears the head-mounted display device, the display screen is basically within the sight of the user, such that the user can observe the display screen as well as GUIs and other visual content displayed thereon.

In addition, the head-mounted display device typically has one or more image sensors, which are used for collecting a user's gestures, such that the head-mounted display device can determine operations to be conducted and instructions to be input by the user by recognizing different gestures of the user. The image sensors can be, e.g., the depth camera module shown in FIG. 1a. For some VR or AR glasses, the image sensors can also collect images from the environment where the user is located, thereby displaying in combination the collected environment images and the GUI or other visible contents on the display screen.

As illustrated in FIG. 1b, the GUI 100 includes a main interface region 102 and an auxiliary interface region 104. The main interface region 102 includes one or more main interface icons 106, each of which corresponds to an application program. For example, one of the main interface icons 106 can be an icon for a weather report application program or an e-mail processing application program, etc. In some embodiments, a size of each of the main interface icons can be determined by the designer of the application program, or can be set by the user. Correspondingly, the user can set the arrangements and positions of the main interface icons according to actual requirements, such that the main interface region can be fully used.

In some embodiments, one or more of the main interface icons 106 can be multi-layer icons. Specifically, each of the multi-layer icons can include a plurality of display layers for respectively displaying different objects and contents. For example, a multi-layer icon can be a dual-layer icon, which includes a graphic layer for displaying graphs or models, and an information layer for displaying text, icons, characters or other similar information. As another example, a multi-layer icon can also be a ternary-layer icon, which further includes a background layer for displaying background images, in addition to said aforesaid graph layer and information layer, thereby providing the prominent visibility of the other two layers, or enhancing visual effect. It can be understood that, because the information layer is also configured inside a main interface icon, internal data, information or status of an application program can be shown by the information layer. In this way, the user can acquire information of the application program corresponding to the main interface icon without running the application program at front end. Such a design significantly improves the convenience of use for the user, and improves efficiency of displaying information. For example, for an e-mail application program consisting of a multi-layer icon, when a new e-mail is received, information such as subject, sender or deliver time, can be extracted and shown on a display screen by the information layer. As such, the user can determine whether to open the e-mail application program for reading the body of the e-mail, after having a look at the information that is preliminarily displayed.

In the GUI illustrated in FIG. 1b, the main interface region 102 further includes a cursor 108 represented as "+". The user can select an application program within the main interface region according to the location of the cursor 108. For example, when a cursor is positioned over a specific application program, the user can input an instruction by providing certain gestures, voices or touches (e.g. touch a touch screen which is provided in the head-mounted display device), thereby starting the application program.

In some embodiments, the cursor 108 can be fixedly displayed in the GUI 100. For example, the cursor 108 can be fixedly displayed at a central position of a GUI displayed by a display screen. That is, the cursor 108 generally locates at the center of the display screen and corresponds to a center line of a user's sight. When a user turns his/her head to the left and right, or upward and downward, the displayed portions of the GUI 100 may vary (the user may feel that his/her sight is scanning the GUI 100), such that the cursor 108 can move relative to application programs on the GUI 100. As such, a user can move the cursor 108 to put it over a specific application program according to actual needs, and then choose to start the application program.

In another embodiment, the cursor can be located and moved in another way. For example, the cursor can be located according to operating gestures of the user which are detected by the image sensors. A detecting range of an image sensor generally corresponds to a displaying range of a display screen. As such, when the user's hand is moving within the detecting range of the image sensor, the hand movement can be observed through the display screen. Correspondingly, a controller of the head-mounted display device can implement certain image recognizing algorithms to recognize a number of characteristic identification points (such as knuckles (including fingertips) or palms) in those operating gestures from the user. As such, the cursor can further be configured to follow the movement of the characteristic identification points. That is, the cursor may be located and moved based on the characteristic identification points.

In some embodiments, when it's recognized that an operating gesture is a directional gesture (one or two fingers are reached out, in which a forefinger is generally supposed to be reached out by default), the fingertip of the forefinger can be used to locate the position of the cursor. In other words, one of the characteristic identification points can be the first knuckle of the forefinger. When the user observes that the first knuckle of the forefinger is moving in the display screen, the cursor would move accordingly. Such manner of locating/moving the cursor is visible and convenient, and can conform to human operation and user habits. In other embodiments, when it's recognized that a gesture is not directional (more than two fingers are reached out), a palm (e.g. the center of a palm) might be used as a characteristic identification point to locate the cursor.

It can be understood that, the aforesaid two manners for locating the cursor can be used in combination. For example, when the image sensor(s) fail to detect operating gestures from the user, the cursor can be located at a predetermined fixed location of the GUI being displayed; and when operating gestures have been detected, characteristic identification points in those operating gestures can be used to determine the location of the cursor in a GUI.

Continuing with FIG. 1b, the auxiliary interface region 104 is adjacent to the main interface region 102, and extends horizontally from the right side of the main interface region 102. In some embodiments, the auxiliary interface region 104 generally has a height identical to that of the main interface region 102. The auxiliary interface region 104 is used for expanding the area of the graphic user interface 100, such that more visible elements can be arranged on the interface 100. In some embodiments, one or more application program icons are arranged in the auxiliary interface region 104. Those application programs can be application programs that are not running, or running application programs. In FIG. 1b, the auxiliary interface region 104 is shown as including an icon array having two rows and five columns. However, it's appreciated that the auxiliary interface region 104 in FIG. 1b is merely an example. For example, icons of application programs can be arranged in one, three, four or more rows. In some embodiments, a length of the auxiliary interface region 104 may depend on a number of application program icons that can be included in the GUI, which is set or determined by the user or the head-mounted display device. For example, when icons are arranged in two rows, the icons in the auxiliary interface region 104 would be shown in 2 columns if four icons are included in total; but the icons in the auxiliary interface region 104 would be shown in 4 columns if eight icons are included in total. In other words, the length of the auxiliary interface region 104 may be longer when the amount of the application program icons increases, or be shorter when the amount of the icons decreases.

In some embodiments, the auxiliary interface region 104 always exists in the GUI. In other embodiments, the auxiliary interface region 104 can be unfolded or folded according to an operating instruction from the user. As illustrated in FIG. 1b, an unfold/fold control 110 is arranged at an edge of the right side of the auxiliary interface region 104, and can be clicked by the user to switch the state of the auxiliary interface region 104 between an unfolded state and a folded state. When in the folded state, the auxiliary interface region 104 is hidden from the GUI, and the auxiliary interface region 104 would not be observed even if this area is within the displaying range of the display screen.

Being similar to the main interface region 102, the auxiliary interface region 104 also can include a cursor. The user can perform an operation such as by moving the cursor, so as to select a required application program, or conduct other suitable operations.

Figure 1C:
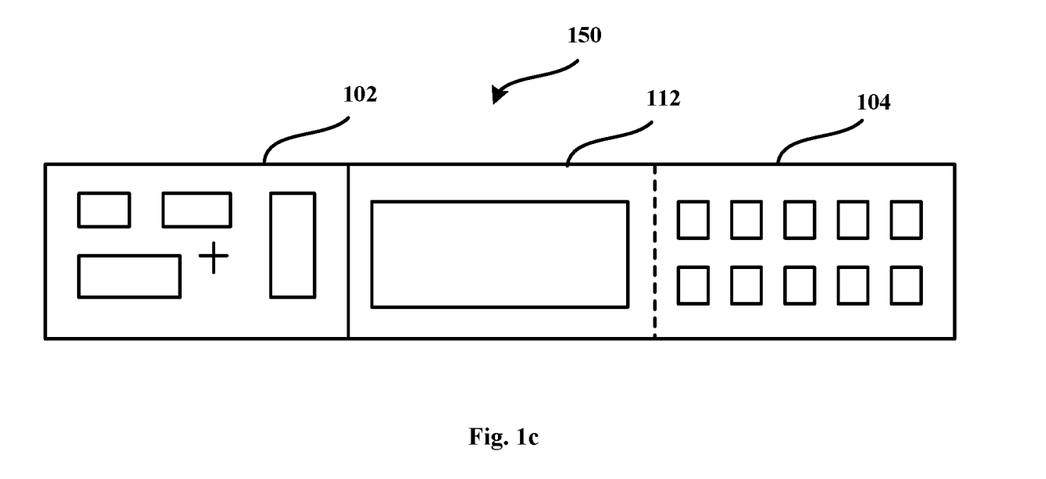
FIG. 1c is a schematic diagram illustrating a GUI of a head-mounted display device according to another embodiment of the present disclosure.

FIG. 1c is a schematic diagram illustrating a GUI 150 of a head-mounted display device according to another embodiment of the present disclosure.

As illustrated in FIG. 1c, the GUI 150 includes a running program interface region 112 adjacent to the main interface region 102 and the auxiliary interface region 104 shown in FIG. 1b. In FIG. 1c, the running program interface region 112 is positioned between the main interface region 102 and the auxiliary interface region 104. However, it can be understood that, in some embodiments, the running program interface region 112 can be positioned at other places, and can have a display depth other than that of the main interface region 102 and the auxiliary interface region 104. The display depth used herein refers to a distance between the user wearing a head-mounted display device and the displayed interface from an observation of the user.

The running program interface region 112 is used for displaying certain interfaces of the window-type application programs which are running. Generally, a small-window-type application program, such as a weather report program, a music player, a clock or notepad application program, does not take up too much display area, and thus can be displayed on the display screen in form of a small window. In the example shown in FIG. 1c, the running program interface region 112 includes a running big-window-type application program, such as a movie player. In other embodiments, however, the running program interface region 112 can display a plurality of window-type application programs simultaneously.

In some embodiments, the running program interface region 112 may change when the type or number of the running application programs change. For example, when the head-mounted display device has no application program running at foreground, the running program interface region 112 can be hidden as shown in FIG. 1b. However, when the user starts a window-type application program, e.g., by clicking on an application program icon on the auxiliary interface region to start the application program, the running program interface region 112 may be unfolded, and the window-type application program will displayed in real time on the running program interface region 112 for the user to observe and use. Further, when the user starts another window-type application program, the running program interface region 112 can additionally display the newly-started application program (e.g., the running program interface region 112 will not be fully occupied by the interfaces of the two application program; or interfaces of the two application program may overlap at least in part, to prevent the running program interface region 112 from being completely occupied). In other embodiments, the newly-started window-type application program can replace the previously started application, thereby displayed on the running program interface region 112.

In some embodiments, the running program interface region 112 may appear simultaneously with the main interface region 102 and the auxiliary interface region 104. In other embodiments, the running program interface region 112 may not appear simultaneously with the main interface region 102 and the auxiliary interface region 104. For example, when the running program interface region 112 appears, the main interface region 102 can be hidden. The hidden main interface region 102 will not be displayed even if it is within the displaying range of the display screen. Further, the user can recover the hidden main interface region by providing an instruction for recovering the main interface region, thereby recovering the display thereof on the display screen. In other embodiments, the re-displayed main interface region may not overlap the running program interfaces, or may overlap the running program interface(s) but with reduced horizontal length.

It is understood that, for consideration of display effect, some application programs, such as game programs, often occupy the entire area of a display screen or interface. Those application programs are generally called as immersive application programs. When an application program of such type is started, e.g., by clicking on an icon of the application program, only the interface of the application program will be retained, and the interfaces of the other application programs will be hidden.

As mentioned above, in some implementations, the running program interface region 112 has a different display depth from other regions of the GUI 150.

Figure 2:
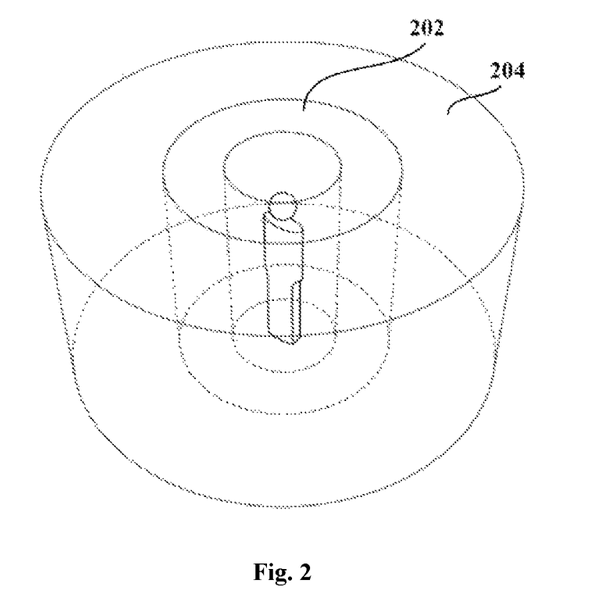
FIG. 2 illustrates examples of different display depths.

FIG. 2 illustrates an example of different display depths. As shown in FIG. 2, from the perspective of the user, a first three-dimensional region 202 observed by the user has a first distance from the user, which can be, for example, 0.5 to 1.0 meter. In addition, a second three-dimensional region 204 observed by the user has a second distance from the user, which is greater than the first distance and can be, for example, 1.0 to 2.0 meters (including 1.0 meter). The two three-dimensional regions 202 and 204 look like two coaxial cylinders centered at position of the user. When a user turns his/her head horizontally, the distance from each cylindrical surface of the first and second three-dimensional regions 202 and 204 to the user would be substantially constant.

In some embodiments, when the GUIs 100 and 150 shown in FIG. 1b and FIG. 1c are displayed on the display screen, these GUIs are placed, from an observation of the user, on one or more cylindrical surfaces of a three-dimensional region. In some examples, the main interface region and the auxiliary interface region are configured at the first three-dimensional region 202 closer to the user, and the running application interface region is configured at the second three-dimensional region 204 farther away from the user.

In some embodiments, an image sensor can be used for detecting the external environment where a user is located, so as to determine whether there is a distinct physical plane, e.g., a wall or a desktop, in the external environment. An area of the physical plane often exceeds a predetermined display size (e.g. exceeds 100 cm²), or said area will occupy more than a threshold proportion of the entire display screen (e.g. 10%). When it is determined that a physical plane does exist, the head-mounted display device can display the GUIs in a way that it seems to be projected on the physical plane. As such, a distance between the displayed GUI and a user would be generally equal to a distance between the physical plane and the user. It can be understood that, in some implementations, a physical plane might not be parallel to the display screen, and thus the distances from different parts of the physical plane to the display screen or the user might be different. A distance between the aforesaid physical plane and the user can be determined as a distance between a center of the physical plane and the user, or an average distance between different parts of the physical plane and the user.

Figure 3:
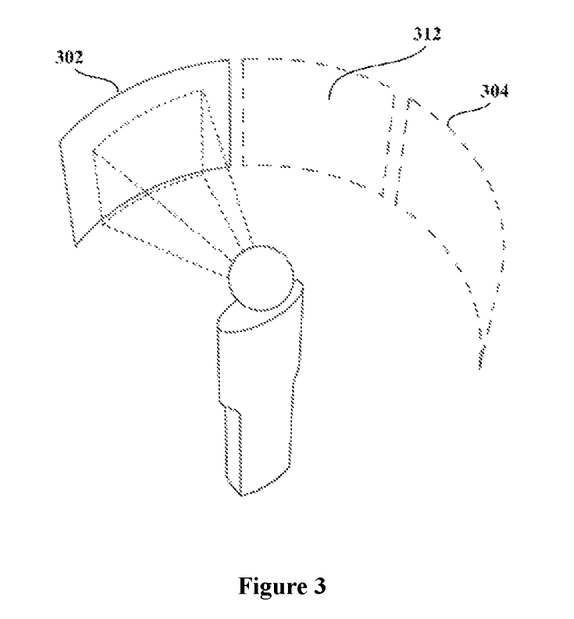
FIG. 3 illustrates an embodiment that a GUI is observed from the perspective of a user.

FIG. 3 illustrates an embodiment that a GUI is observed from the perspective of a user. In FIG. 3, all regions of the GUI are configured at the same cylindrical surface centered at the position of the user. In addition, the regions are horizontally arranged, and generally have the same height.

It shall be noted that, both GUIs shown in FIGS. 1b and 1c are in an ideal condition (i.e. in a condition that a resolution and a size of the display screen is high enough), such that the user can observe that the full images are displayed on the display screen. That is, the main interface region 102 and the auxiliary interface region 104 are simultaneously displayed on the display screen. However, for a head-mounted display device, its display screen generally has a limited resolution and size. When there are a lot of application program icons arranged on the two interface regions 102 and 104, the display screen may fail to simultaneously display all contents of the two interface regions. Correspondingly, in order to display the GUIs according to a user's requirement, the system of the head-mounted display device may provide a user interface movement instruction. For example, when the user inputs a user interface movement instruction, the GUI 100 can move within the displaying range of the display screen, such that different regions of the GUI 100 can be displayed.

As shown in FIG. 3, the main interface region 302, the running program interface region 312 and the auxiliary interface are 304 are successively arranged from left to right. In such embodiment, when the user's sight is towards the main interface region 302, the display screen of the head-mounted display device is guided towards the main interface region 302. Accordingly, the main interface region 302 is displayed on the display screen, while the running program interface region 312 and the auxiliary interface region 304, where the display screen does not face directly, are not be displayed on the display screen (shown in dashed lines).

If the user's sight turns to the running program interface region 312, motion sensor(s) (e.g. a gyroscope) on the head-mounted display device can detect the horizontal turning or rotation of the user's head, such that a user interface movement instruction might be generated. As such, in response to such instruction, the running program interface region 312 can be displayed on the display screen (assuming that a window-type application program has been started by the user to activate the region 312), and the other two regions are not be displayed. Similarly, if the user's sight turns to the auxiliary interface region 304, the region 304 may be displayed on the display screen. It can be understood that, in some embodiments, the displaying and non-displaying of different regions can change gradually (boundary portions between adjacent regions can be simultaneously displayed during the shift), or can change abruptly (only one region can be displayed during the shift).

In some embodiments, the user can input or provide a user interface movement instruction in other manners. For example, the user can provide a user interface movement instruction by providing an operating gesture. Specifically, the user can place one of his or her hands within a detecting range of an image sensor of the head-mounted display device, and horizontally and/or laterally move the hand, e.g., horizontally and/or laterally move a palm with fingers outstretched. When the palm moves to the left, it looks like that the GUI as a whole is dragged by the palm to move or roll to the left. With respect to the display screen, the region of the GUI displayed thereon moves to right, e.g., from the main interface region to the auxiliary interface region. Similarly, the display region of the GUI can move to right when the palm of the user's hand moves to right; the display region of the GUI can move upwards when the palm moves downward; and the display region of the GUI can move downward when the palm moves upward.

In some embodiments, a GUI further includes an information display layer, which is displayed at a predetermined fixed location on the display screen. In other embodiments, the information display layer can overlap the main interface region and/or the auxiliary interface region. The information display layer can display certain system parameters, or other information needed to be displayed constantly, e.g., current time, parameters of operating status of the head-mounted device.

In some embodiments, the GUI further includes a virtual content layer. The virtual content layer can include display contents acquired by image sensors or other means. For example, the location of the user can be determined by a GPS locating device, and then the head-mounted display device can acquire corresponding images, e.g. images reflecting actual environment or background of the location, based on the determined location of the user. The aforesaid images can be displayed on the display screen. Display content of the virtual content layer has no limitation on its display distance, but may depends on related information sources. For example, if a picture is scanned, virtual information overlapping the picture may vary based on the distance of the actual picture from the user. Again, if a coordinate of actual geographic information is displayed, its displayed distance complies with the actual geographic information. However, due to the characteristic of human-eye perception, beyond certain distance, it may not matter for a human eye as to how faraway it is displayed.

In actual applications, the user can operate the head-mounted display device through various input interfaces. For example, operating gestures (obtained by image sensors), voices (obtained by microphones), or touches (obtained by touchpads) may be used for operation purpose. Those operations can change the display of the GUIs, thereby meeting a user's requirements.

Figure 4:
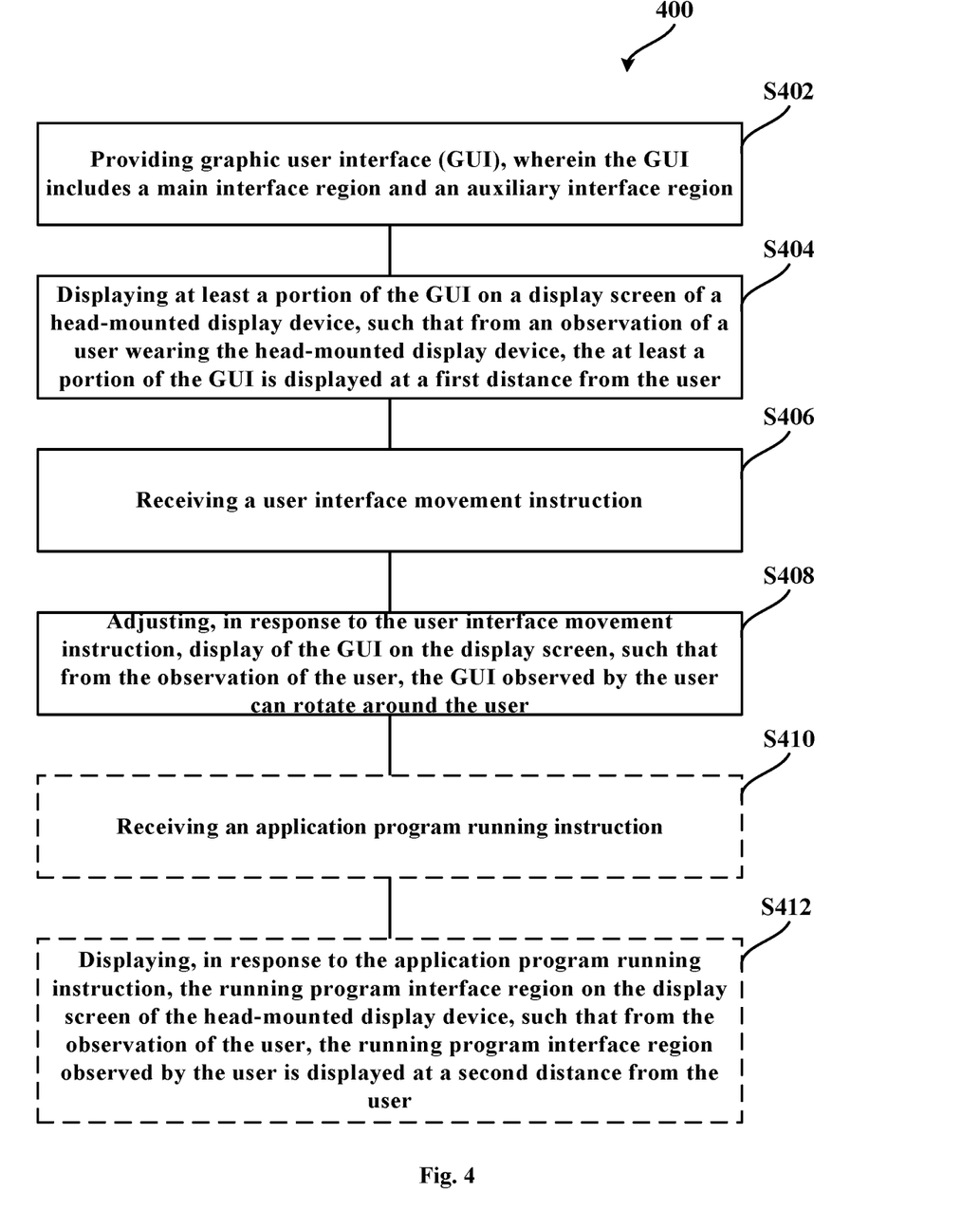
FIG. 4 illustrates a method for displaying a GUI according to an embodiment of the present disclosure.

FIG. 4 illustrates a method 400 for displaying a GUI according to an embodiment of the present disclosure. The method 400 can operate the GUI shown in FIG. 1b or 1c.

As shown in FIG. 4, in step S402, a GUI including a main interface region and an auxiliary interface region is provided. In step S404, at least a portion of the GUI is displayed on a display screen of a head-mounted display device, such that from an observation of a user wearing the head-mounted display device, the at least a portion of the graphic user interface is displayed at a first distance from the user. In step S406, a user interface movement instruction is received. In step S408, in response to the user interface movement instruction, a display of the graphic user interface on the display screen is adjusted, such that, from the observation of the user, the graphic user interface observed by the user can rotate around the user.

Particularly, in some embodiments, the method 400 further includes step S410, an application program running instruction is received. In step S412, in response to the application program running instruction, the running program interface region is displayed on the display screen of the head-mounted display device, such that, from the observation of the user, the running program interface region observed by the user is displayed at a second distance from the user. In some embodiments, in response to the application program running instruction, the main interface region is hidden from the display screen. In an embodiment, the application program running instruction can be that a user clicks on an icon of an application program. The click operation can be that, e.g., a user's forefinger tip touches with his or her thumb tip and then separates therefrom, or the user's forefinger tip moves forwards along his or her sight.

Further, the head-mounted display device can receive a main interface recovering instruction. In response to the main interface recovering instruction, the main interface region is re-displayed on the display screen, such that the main interface region at least partially overlaps the running program interface region. For example, the main interface recovering instruction can be generated by a palm pushback gesture.

Figure 5:
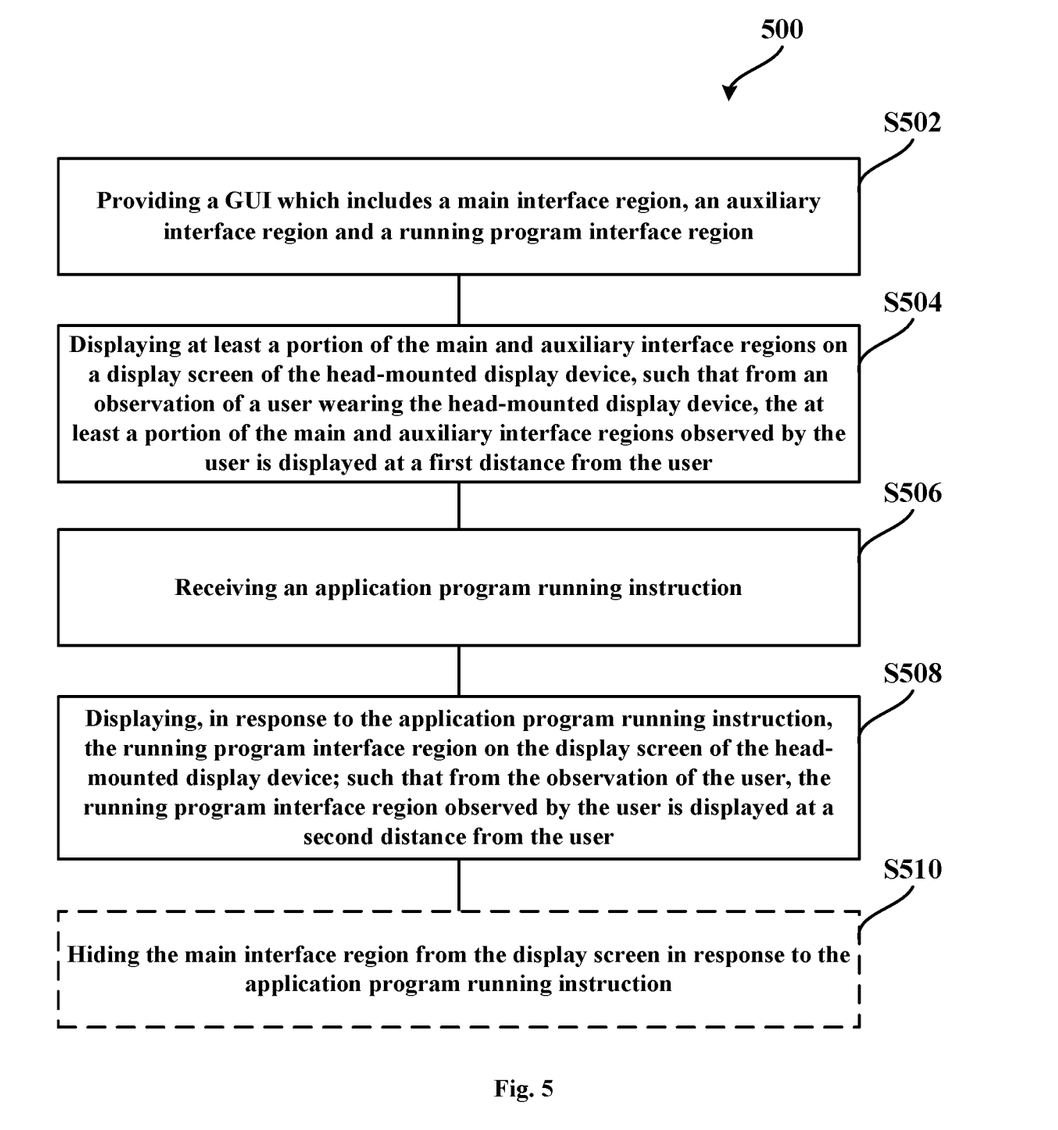
FIG. 5 illustrates a method for displaying a GUI according to another embodiment of the present disclosure.

FIG. 5 illustrates a method 500 for displaying a GUI according to another embodiment of the present disclosure. The method 500 can operate the GUI shown in FIG. 1b or 1c.

As shown in FIG. 5, in step S502, a graphic user interface, which includes a main interface region, an auxiliary interface region and a running program interface region, is provided. In step S504, at least a portion of the main and auxiliary interface regions is displayed on a display screen of the head-mounted display device, such that from an observation of a user wearing the head-mounted display device, the at least a portion of the main and auxiliary interface regions observed by the user is displayed at a first distance from the user. In step S506, an application program running instruction is received. In step S508, in response to the application program running instruction, the running program interface region is displayed on the display screen of the head-mounted display device; such that, from the observation of the user, the running program interface region observed by the user is displayed at a second distance from the user. In some embodiments, the method 500 further includes step S510, in which the main interface region is hidden from the display screen in response to the application program running instruction.

Figure 6:
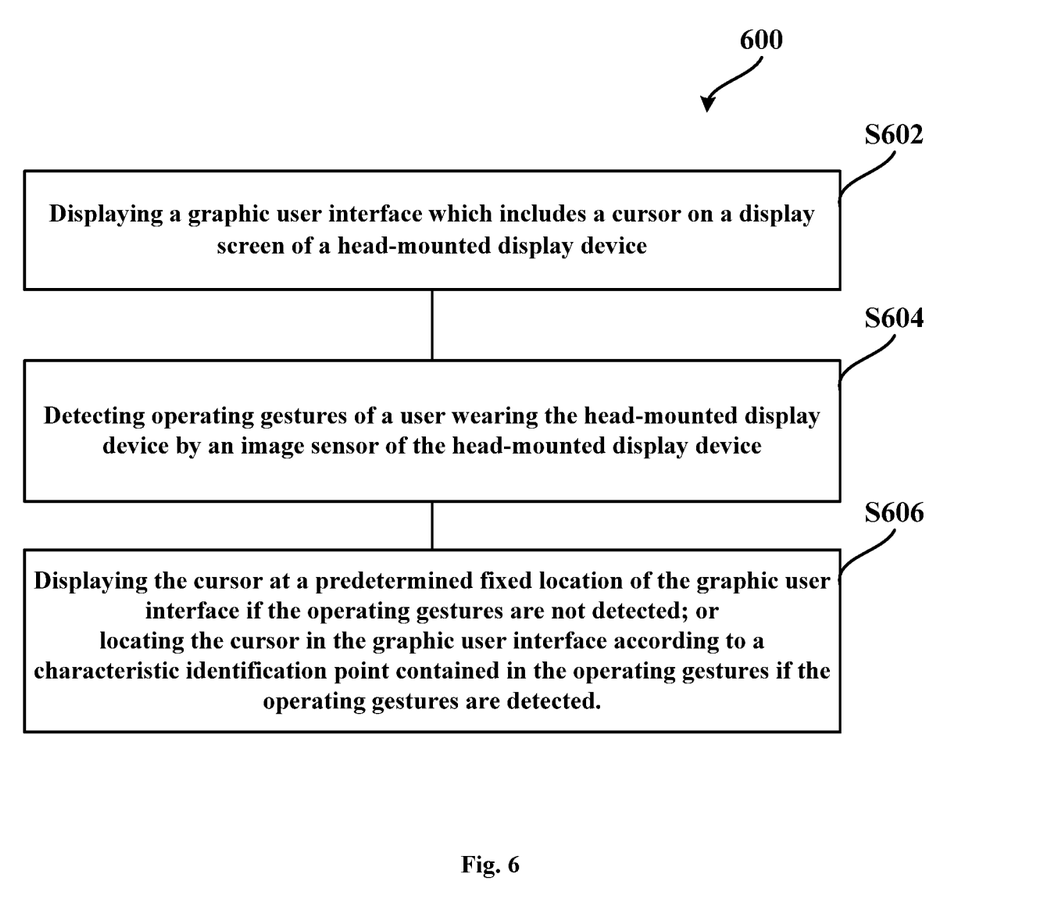
FIG. 6 illustrates a method for displaying a GUI according to yet another embodiment of the present disclosure.

FIG. 6 illustrates a method 600 for displaying a GUI according to yet another embodiment of the present disclosure. The method 600 can operate the GUI shown in FIG. 1b or 1c.

As shown in FIG. 6, in step S602, a graphic user interface which includes a cursor is displayed on a display screen of the head-mounted display device. In step S604, operating gestures of a user wearing the head-mounted display device is detected by an image sensor of the head-mounted display device. In step S606, if the operating gestures are not detected, the cursor is displayed at a predetermined fixed location of the graphic user interface; or if the operating gestures are detected, the cursor is located or moved in the graphic user interface according to a characteristic identification point contained in the operating gestures.

In some embodiments, the operating gestures are directional gestures, and the characteristic identification point is a knuckle of an outstretched finger. In some embodiments, the knuckle of the outstretched finger is a first knuckle of a forefinger. In some embodiments, the operating gestures are not directional gestures, and the characteristic identification point is a palm, e.g., the center of the palm. In some embodiments, the predetermined location is a center of the display screen.

It can be understood that, the user can operate the graphic user interface using various gestures.

FIG. 7 illustrates a number of operating gestures and the corresponding instructions. For example, a direction Z is generally parallel to the user's sight, and a plane XY is generally perpendicular to the user's sight. It's appreciated that, those gestures are merely illustrative, and shall not be deemed as limitation to the present disclosure.

As shown in FIG. 7, two gestures are provided as click gestures. Particularly, a click gesture 1 is that a forefinger tip touches and then separates from a thumb tip; and a click gesture 2 is that a forefinger tip moves forward along an axis Z. When those gestures are detected, a head-mounted display device can determine that a user wants to click on an icon of an application program at which a cursor is located, thereby selecting or starting the application program.

Two gestures are provided as drag gestures, i.e., a click drag gesture and a grab drag gesture. The click drag gesture is that a forefinger tip touches but not releases (not separates) from a thumb tip, and then proceeds with a drag action (e.g. move along a direction or a specific path). As such, an icon that is dragged can be moved in the GUI. Similarly, the grab drag gesture is that a palm makes a fist and moves, thereby moving in the GUI an icon or other elements at which a cursor located when fisted.

An upward-roll gesture is further provided, which is that a palm of one hand waves or moves upward, thereby moving upward the GUI or other display elements (e.g. icons). In some implementations, such gesture further controls the zoom in of an element displayed. For example, when an operated element is a picture, the user can provide such gesture to zoom in the picture.

A downward-roll gesture is further provided, which is that a palm of one hand waves or moves downward, thereby moving downward the GUI or other display elements (e.g. icons). In some implementations, such gesture further controls the zoom out of a displayed element. For example, when an operated element is a picture, the user can provide such gesture to zoom out the picture.

A left turn or roll gesture is further provided, which is that a palm of one hand waves or moves left, such that the GUI or other display elements (e.g. icons) is moved (e.g., when a plane icon is operated) or rotated (e.g., when a display element of a three-dimensional icon is operated) to the left.

A right turn or roll gesture is further provided, which is that a palm of one hand waves or moves right, such that the GUI or other display elements (e.g. icons) is moved (e.g., when a plane icon is operated) or rotated (e.g., when a display element of a three-dimensional icon is operated) to the right.

A close gesture is further provided, which is pushing forward a palm with five fingers stretched out. Some regions of the GUI, or some windows and interfaces can be closed using such gesture. For example, such gesture can be used when the user wants to close the main interface region.

A gesture for calling out the main interface region is further provided, which is: pulling backward a palm with five fingers stretched out. When such gesture is detected, a head-mounted display device can determine that a user has provided a main interface recovering instruction, and thus proceed to recover the display of the main interface region.

It can be seen that, those gestures are easy to operate, and are significantly distinguishing from each other. Thus, the above gestures can facilitate the detection and recognition of the image sensor, and thus significantly improves the operation efficiency of the head-mounted display device.

Those skilled in the art may understand and implement other variations to the disclosed embodiments from a study of the drawings, the disclosure, and the appended claims. The above embodiments are presented by way of example only, and not limitation. The embodiments of the disclosure may be implemented in the form of hardware, software, or a combination thereof. Any modification, equivalent substitution, and improvement without departing from the spirit and principle of this invention should be covered in the protection scope of the invention. In the claims, the word "comprising" does not exclude other elements or steps, and the indefinite article "a" or "an" does not exclude a plurality. In disclosures according to present disclosure, one element may perform functions of several technical feature recited in claims. Any reference signs in the claims should not be construed as limiting the scope. The scope and spirit of the present disclosure is defined by the appended claims.

What is claimed is:

1. A method for displaying a user interface (UI) of a head-mounted display device, comprising:
   providing a graphic user interface which comprises a main interface region and an auxiliary interface region, wherein the main interface region comprises one or more main interface icons, each of which corresponds to an application program;
   displaying at least a portion of the graphic user interface on a display screen of the head-mounted display device, such that from an observation of a user wearing the head-mounted display device, said at least a portion of the graphic user interface is displayed at a first distance from the user;
   receiving a user interface movement instruction; and
   adjusting, in response to the user interface movement instruction, a display of the graphic user interface on the display screen, such that from the observation of the user, the graphic user interface rotates around the user, wherein the first distance is determined by:
      detecting, by an image sensor of the head-mounted display device, an external environment of the user, to determine whether a physical plane that occupies more than a threshold display size or proportion of the head-mounted display device exists in the external environment; and
      using a distance between the physical plane and the user as the first distance if the physical plane does exist, such that from the observation of the user wearing the head-mounted display device, said at least a portion of the graphic user interface is displayed on the physical plane.

2. The method of claim 1, wherein a size and/or location of each of said one or more main interface icons can be configured by the user.

3. The method of claim 2, wherein at least one of said one or more main interface icons is a multi-layer icon which comprises a plurality of display layers for displaying respective objects and contents.

4. The method of claim 1, wherein the main interface region is adjacent to the auxiliary interface region.

5. The method of claim 1, wherein the auxiliary interface region comprises one or more application program icons.

6. The method of claim 5, wherein said one or more application program icons are arranged in the auxiliary interface region in a matrix format.

7. The method of claim 1, wherein receiving the user interface movement instruction comprises:
   detecting, by an image sensor of the head-mounted display device, an operating gesture of the user; and
   generating a corresponding user interface movement instruction in response to the operating gesture.

8. The method of claim 7, wherein the operating gesture comprises a lateral or a horizontal movement of a palm.

9. The method of claim 1, wherein receiving the user interface movement instruction comprises:
   detecting, by a gyroscope of the head-mounted display device, a horizontal rotation of the user's head; and
   generating a corresponding user interface movement instruction in response to the horizontal rotation of the user's head.

10. The method of claim 1, wherein the auxiliary interface region can be unfolded or folded by clicking an unfold-fold control in the main interface region.

11. The method of claim 1, wherein the graphic user interface further comprises an information display layer, which is fixedly displayed at a predetermined location of the display screen, and overlaps with the main interface region and/or the auxiliary interface region.

12. The method of claim 1, wherein the graphic user interface further comprises a virtual content layer.

13. The method of claim 1, wherein the graphic user interface further comprises a running program interface region, and the method further comprises:
   receiving an application program running instruction; and
   displaying, in response to the application program running instruction, the running program interface region of the graphic user interface on the display screen of the head-mounted display device, such that from the observation of the user, the running program interface region is displayed at a second distance from the user.

14. The method of claim 13, further comprising:
   hiding, in response to the application program running instruction, the main interface region from the display screen.

15. The method of claim 14, further comprising:
   receiving a main interface recovering instruction; and
   re-displaying, in response to the main interface recovering instruction, the main interface region on the display screen, such that the main interface region at least partially overlaps the running program interface region.

16. The method of claim 13, wherein the first distance is shorter than the second distance.

17. The method of claim 13, wherein the first distance is 0.5 to 1.0 meter, and the second distance is 1.0 to 2.0 meters.

18. The method of claim 1, wherein the head-mounted display device is augmented reality or virtual reality glasses.

19. A method for displaying a user interface of a head-mounted display device, comprising:
   providing a graphic user interface which comprises a main interface region, an auxiliary interface region and a running program interface region, wherein the main interface region comprises one or more main interface icons, each of which corresponds to an application program;
   displaying at least a portion of the main and auxiliary interface regions on a display screen of the head-mounted display device, such that from an observation of a user wearing the head-mounted display device, said at least a portion of the main and auxiliary interface regions is displayed at a first distance from the user;
   receiving an application program running instruction; and
   displaying, in response to the application program running instruction, the running program interface region on the display screen of the head-mounted display device, such that from the observation of the user, the running program interface region is displayed at a second distance from the user, wherein the first distance is determined by:
      detecting, by an image sensor of the head-mounted display device, an external environment of the user, to determine whether a physical plane in the external environment that occupies more than a threshold display size or proportion of the head-mounted display device exists in the external environment; and
      using a distance between the physical plane and the user as the first distance if the physical plane does exist, such that from the observation of the user wearing the head-mounted display device, said at least a portion of the graphic user interface is displayed on the physical plane.

20. The method of claim 19, further comprising:
   hiding, in response to the application program running instruction, the main interface region on the display screen.

21. The method of claim 19, wherein at least one of the one or more main interface icons is a multi-layer icon which comprises a plurality of display layers for displaying respective objects and contents.

* * * * *